(12) United States Patent
Bathen et al.

(10) Patent No.: US 11,157,782 B2
(45) Date of Patent: Oct. 26, 2021

(54) ANOMALY DETECTION IN MULTIDIMENSIONAL TIME SERIES DATA

(71) Applicant: INTERNATIONAL BUSINESS MACHINES CORPORATION, Armonk, NY (US)

(72) Inventors: Luis Angel D. Bathen, Placentia, CA (US); Simon-Pierre Genot, San Jose, CA (US); Mu Qiao, Belmont, CA (US); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 15/815,057

(22) Filed: Nov. 16, 2017

(65) Prior Publication Data

US 2019/0147300 A1    May 16, 2019

(51) Int. Cl.

| | | |
|---|---|---|
| *G06K 9/62* | (2006.01) | |
| *G06N 3/08* | (2006.01) | |
| *G06F 17/15* | (2006.01) | |
| *G06N 3/04* | (2006.01) | |
| *G06F 17/17* | (2006.01) | |
| *G06K 9/00* | (2006.01) | |

(52) U.S. Cl.
CPC ......... *G06K 9/6284* (2013.01); *G06F 17/153* (2013.01); *G06N 3/0454* (2013.01); *G06N 3/088* (2013.01); *G06F 17/175* (2013.01); *G06K 9/00536* (2013.01); *G06K 9/6281* (2013.01)

(58) Field of Classification Search
CPC ............ G06F 16/2365; G06F 16/2237; G06F 17/153; G06F 17/175; G06N 3/04; G06N 3/0454; G06N 3/088; G06K 9/005; G06K 9/6284; G06K 9/00536; G06K 9/6281
See application file for complete search history.

(56) References Cited

U.S. PATENT DOCUMENTS

| | | | | |
|---|---|---|---|---|
| 7,716,011 | B2 * | 5/2010 | Thibaux | .............. H04L 63/1425 702/179 |
| 10,410,113 | B2 * | 9/2019 | Clayton | ............... G06N 3/0445 |
| 2014/0279779 | A1 | 9/2014 | Zou et al. | |
| 2016/0299938 | A1 | 10/2016 | Malhotra et al. | |

(Continued)

OTHER PUBLICATIONS

P. J. Werbos, "Backpropagation through time: what it does and how to do it," in Proceedings of the IEEE, vol. 78, No. 10, pp. 1550-1560, Oct. 1990, doi: 10.1109/5.58337. (Year: 1990).*

(Continued)

*Primary Examiner* — Alan Chen
(74) *Attorney, Agent, or Firm* — Robert R. Aragona (57) ABSTRACT

A method, computer system, and computer program product to detect anomalies in a multivariate or multidimensional time series data set. The time series data set is retrieved from a monitored device. A pair of neural networks are trained simultaneously using the retrieved time series data set by implementing an adversarial training process, to generate a generative neural network and a discriminative neural network. The anomalies in the time series data set of the monitored device are detected by implementing one or both of the generative neural network and the discriminative neural network to monitor the time series data set.

17 Claims, 7 Drawing Sheets

(56) References Cited

U.S. PATENT DOCUMENTS

2016/0342453 A1\* 11/2016 Khan .................. G06F 11/0751
2016/0352767 A1   12/2016 Owhadi

OTHER PUBLICATIONS

E. Marchi, F. Vesperini, F. Eyben, S. Squartini and B. Schuller, "A novel approach for automatic acoustic novelty detection using a denoising autoencoder with bidirectional LSTM neural networks," 2015 IEEE International Conference on Acoustics, Speech and Signal Processing, 2015, pp. 1996-2000 (Year: 2015).\*

E. Principi, F. Vesperini, S. Squartini and F. Piazza, "Acoustic novelty detection with adversarial autoencoders," 2017 International Joint Conference on Neural Networks (IJCNN), Anchorage, AK, 2017, pp. 3324-3330, doi: 10.1109/IJCNN.2017.7966273. (Year: 2017).\*

Erik Marchi, Fabio Vesperini, Stefano Squartini, Björn Schuller, "Deep Recurrent Neural Network-Based Autoencoders for Acoustic Novelty Detection", Computational Intelligence and Neuroscience, vol. 2017, Article ID 4694860, 14 pages, 2017. https://doi.org/10.1155/2017/4694860 (Year: 2017).\*

J.P. Assendorp, "Deep learning for anomaly detection in multivariate time series data" 2017 Master thesis submitted as part of the master's examination (Year: 2017).\*

Goodfellow et al., "Generative Adversarial Nets", Jun. 10, 2014, 9 Pages, http://www.github.com/goodfeli/adversarial.

Le, "A Tutorial on Deep Learning Part 2: Autoencoders, Convolutional Neural Networks and Recurrent Neural Networks", Google Brain, Oct. 20, 2015, 20 Pages, Google Inc., Mountain View, CA.

Mell et al., "The NIST Definition of Cloud Computing", NIST, Sep. 2011, 7 Pages, Special Publication 800-145, U.S. Department of Commerce, Gaithersburg, MD.

\* cited by examiner

ANOMALY DETECTION IN MULTIDIMENSIONAL TIME SERIES DATA

BACKGROUND

The present invention relates generally to anomaly detection in multivariate or multidimensional time series data, and in particular to training neural networks for use in anomaly detection in multivariate or multidimensional time series data.

Anomaly detection may be applied to a time series data set to detect anomalous, unusual, or unexpected data points in the data set. A data point recorded at a point in time in a time series data set may represent a value or observation of a variable, parameter, item, or event as recorded at the point in time in the time series data set. Where data points represent system or process variables or parameters, an anomalous data point may serve as an indication of a corresponding issue that may be present in the system or process, accordingly. Early identification of the anomalous data point with respect to the system or process allows for early identification and remediation of the issue in turn, to minimize or prevent losses in the system or process.

SUMMARY

Aspects of the present invention are directed to a method, system, and computer program product.

According to an aspect of the present invention, a method to detect anomalies in a multivariate or multidimensional time series data set is provided. The method may include retrieving the time series data set from a monitored device. A pair of neural networks are trained simultaneously using the retrieved time series data set, by implementing an adversarial training process to generate a generative neural network and a discriminative neural network. The anomalies are detected in the time series data set of the monitored device by implementing one or both of the generative neural network and the discriminative neural network to monitor the time series data set.

According to an aspect of the present invention, a computer system is provided. The computer system may include one or more computer processors, one or more computer-readable storage media, and program instructions stored on one or more of the computer-readable storage media for execution by at least one of the one or more computer processors. The program instructions may be executed to perform the disclosed method.

According to an aspect of the present invention, a computer program product is provided. The computer program product may include one or more computer-readable storage devices and program instructions stored on at least one of the one or more computer-readable storage devices for execution by at least one or more computer processors of a computer system. The program instructions may be executed by the at least one or more computer processors of the computer system to perform the disclosed method.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

A method to detect anomalies in a multivariate or multidimensional time series data set includes application of a machine learning technique with respect to a system to enable the system for use in detecting the anomalies in the time series data set. An anomaly may include, for example, an anomalous data point in the time series data set having a value significantly different than that which may be expected, such as with respect to values of one or more previous data points in the data set and a trend or pattern exhibited or supported by the previous data points. The anomaly may be detected, for example, where differences exceed a predetermined threshold.

An unsupervised machine learning technique that may be used in the method to detect the anomalies in time series includes, for example, using a statistical model such as a vector autoregression stochastic process model with respect to a time series data set to model the time series data set for time series forecasting. In an example, the model may be generated for use by the system to forecast or predict a value expected of a future data point in a monitored time series data set based on the previous data points of the monitored time series data set. In the example, where a difference between the expected value and an actual value of the future data point in the monitored time series data set exceeds a predetermined threshold, an anomaly in the monitored time series data set may be detected. Use of the vector autoregression stochastic process model and similar types of models, such as certain distance based anomaly detection methods including the local outlier factor method, may lead to various issues when used in the method to detect the anomalies in the time series.

For example, the vector autoregression stochastic process model attempts to characterize and define a temporal evolution of values of a variable or parameter in a time series data set by defining a linear function in terms of "past lags," or previous values of the variable in a monitored time series data set. Errors due to an incomplete consideration for, or an insufficient modeling of the temporal evolution of the values of the variable that may be caused by defining the temporal evolution as such may introduce errors or inaccuracies in the method to detect the anomalies in the time series. Further, temporal trends such as seasonal temporal trends of the temporal evolution of the values may be insufficiently modeled, which may exacerbate the errors. Further, the use of the vector autoregression stochastic process model, and the like, in the method to detect the anomalies in the time series may complicate parameter estimations and create various computational issues.

A supervised machine learning technique that may alternatively or additionally be used in the method to detect the anomalies in time series includes, for example, training a neural network for use as a binary classifier for classification of anomalous and non-anomalous data points in a time series data set. In an example, the binary classifier may be trained by input of historical time series data sets having anomalous data points, for use of the binary classifier in detecting anomalies in a monitored time series data set. In the example, the binary classifier may generate time series data models based on the monitored time series data set and the historical time series data sets to classify the anomalous and non-anomalous data points based on various characteristics and patterns, but may insufficiently consider or model the temporal evolution and thereby introduce errors or inaccuracies if used in the method to detect the anomalies in the time series. Further, the input historical time series data sets used in the training may include an insufficient amount of "positive" samples or anomalous data points causing deficiencies and imbalanced performance of the binary classifier if used in the method to detect the anomalies in the time series.

Influence of the temporal evolution of the data points may be important in the method to detect the anomalies in time series.

Embodiments of the present invention are directed to a system and method for detecting anomalies in a multivariate or multidimensional time series data set. The method implements an adversarial training process to simultaneously train and generate a generative neural network and a discriminative neural network for use in detecting anomalies in a monitored time series data set.

Advantageously, embodiments of the present invention provide an improvement to anomaly detection technologies and methods, and overcome the various aforementioned issues associated with the use of the certain unsupervised and supervised machine learning techniques to detect anomalies in the time series. The deep learning framework implemented by the generated neural networks enables more accurate and effective capture of characteristics and properties of monitored time series data sets, including those relating to the temporal trends. The deep learning framework implemented by the generated neural networks may further avoid use of the aforementioned numerical and statistical assumptions. Further, the adversarial training process enables automated training of the method by use in detecting anomalies in the time series, enabling constant improvement without requiring additional training data.

Figure 1:
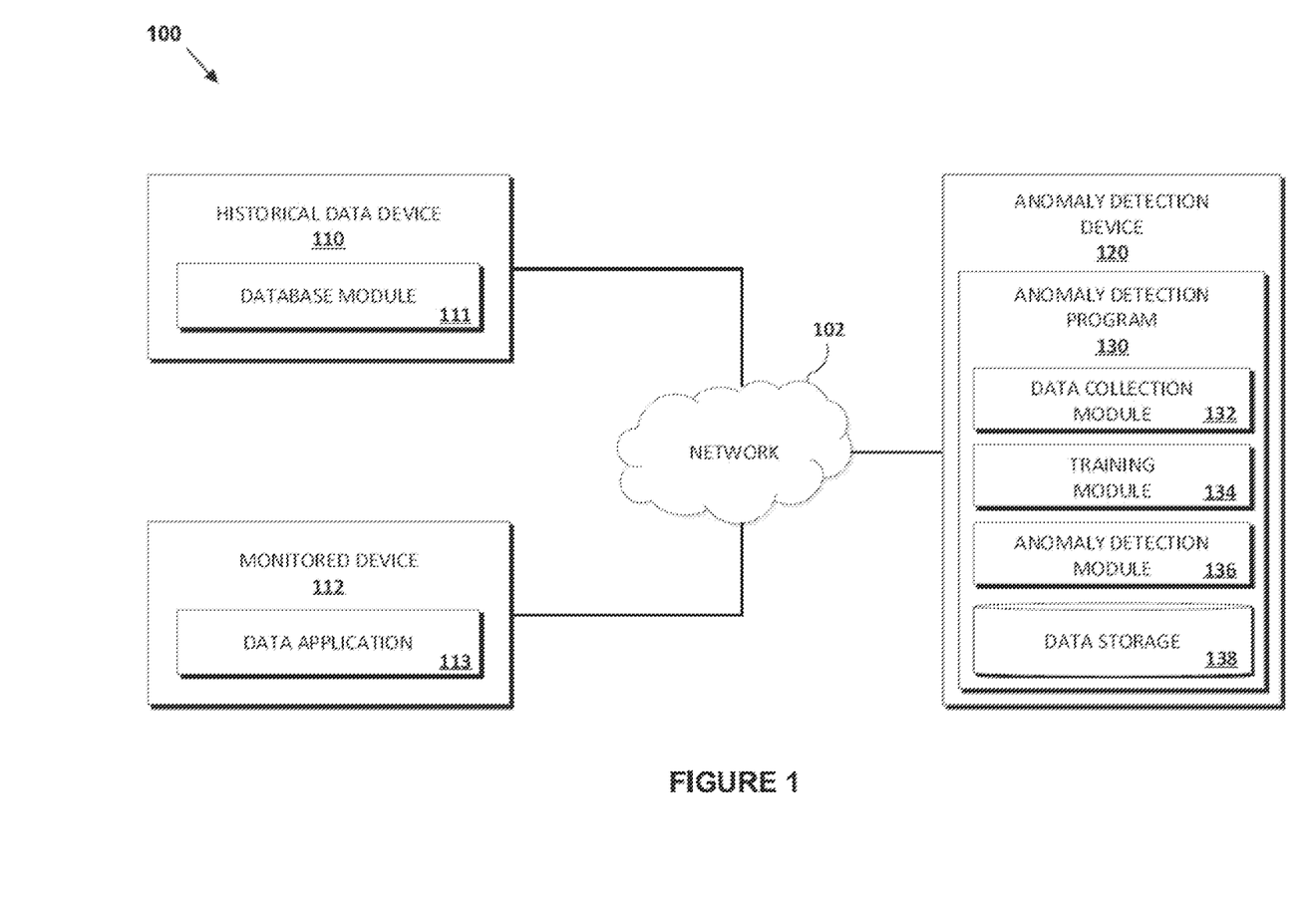
FIG. 1 is a functional block diagram depicting an anomaly detection system, in accordance with an embodiment of the present invention.

FIG. 1 is a functional block diagram depicting anomaly detection system 100, in accordance with an embodiment of the present invention. Anomaly detection system 100 may include historical data device 110, monitored device 112, and anomaly detection device 120, interconnected by way of network 102, accordingly. While FIG. 1 depicts three discrete devices in anomaly detection system 100, other arrangements may be contemplated, for example, historical data device 110, monitored device 112, and anomaly detection device 120 may be one or more integrated devices.

In various embodiments of the present invention, network 102 represents, for example, an intranet, a local area network (LAN), a personal area network (PAN), a wireless local area network (WLAN), a wireless personal area network (WPAN), or a wide area network (WAN) such as the Internet, and may include wired, wireless, or fiber optic connections. In general, network 102 may be any combination of connections and protocols that may support communications between historical data device 110, monitored device 112, and anomaly detection device 120, in accordance with embodiments of the present invention. In the various embodiments, network 102 may be, for example, the Internet, representative of a worldwide collection of networks and gateways that may support communications between devices connected to the Internet.

In various embodiments of the present invention, historical data device 110, monitored device 112, and anomaly detection device 120 each respectively represent individual or integrated computing platforms such as a wearable or implantable computer or device, a smart phone, a tablet computer, a laptop computer, a desktop computer, or a computer server. In the various embodiments, historical data device 110, monitored device 112, or anomaly detection device 120 may otherwise be any other type of computing platform, computing system, or information system capable of sending and receiving data to and from another device by way of network 102. Historical data device 110, monitored device 112, or anomaly detection device 120 may include internal and external hardware components, as described with reference to FIG. 3. In other embodiments, historical data device 110, monitored device 112, or anomaly detection device 120 may be implemented in a cloud computing environment, as described with reference to FIGS. 4 and 5.

In an embodiment of the present invention, historical data device 110 may be, for example, a computing platform that hosts a database management system such as database module 111. Historical data device 110 may implement a combination of devices and technologies, such as network devices and corresponding device drivers, to support the operation of database module 111, and to provide a platform enabling communications between historical data device 110, monitored device 112, and anomaly detection device 120, accordingly.

Database module 111 may be a program such as a software program, one or more subroutines contained in a program, an application programming interface, or the like. In an embodiment of the present invention, database module 111 may host data such as prior or historical time series data sets, in accordance with embodiments of the present invention.

In an embodiment of the present invention, monitored device 112 may be, for example, a computing platform that hosts an application such as data application 113. Monitored device 112 may implement a combination of devices and technologies, such as network devices and corresponding device drivers, to support the operation of data application 113, and to provide a platform enabling communications between historical data device 110, monitored device 112, and anomaly detection device 120, accordingly.

Data application 113 may be a program such as a software program, one or more subroutines contained in a program, an application programming interface, or the like. In an embodiment of the present invention, data application 113 may host data including a monitored time series data set. In the embodiment, the monitored time series data set may include multivariate or multidimensional time series data.

In an embodiment of the present invention, the monitored time series data set may include, for example, multidimensional operational or system parameter time series data of monitored device 112, such as with respect to usage of a processor, a network transmission rate, main memory utilization, or the like. In the embodiment, the monitored time series data set may additionally or alternatively include, for example, third-party time series data. In the embodiment, the third-party time series data may include, for example, process data, such as provided by a third-party financial application in providing various financial services such as credit reporting, or the like. Generally, the time series data may include any type of multidimensional time series data in accordance with embodiments of the present invention.

In an embodiment of the present invention, anomaly detection device 120 may be, for example, a computing platform that hosts an application such as anomaly detection program 130. Anomaly detection device 120 may implement a combination of devices and technologies, such as network devices and corresponding device drivers, to support the operation of anomaly detection program 130, and to provide a platform enabling communications between historical data device 110, monitored device 112, and anomaly detection device 120, accordingly.

Anomaly detection program 130 may be a program such as a software program, one or more subroutines contained in a program, an application programming interface, or the like. Anomaly detection program 130 may include data collection module 132, training module 134, anomaly detection module 136, and data storage 138. In an embodiment of the present invention, anomaly detection program 130 may host data including, for example, a monitored time series data set and the historical time series data.

Data collection module 132 communicates with a monitored device such as monitored device 112 to retrieve data including the monitored time series data set. Data collection module 132 further communicates with a device hosting historical time series data to retrieve data including the historical time series data. Data collection module 132 may store the retrieved data in data storage 138 such as in the form of separate computer-readable data files for later retrieval and use.

Training module 134 trains pairs of neural networks simultaneously for use in detecting anomalies in the monitored time series data set. In an embodiment of the present invention, training module 134 may train a pair of individual recurrent multilayer perceptron neural networks simultaneously by implementing, for example, an adversarial training process.

Figure 6:
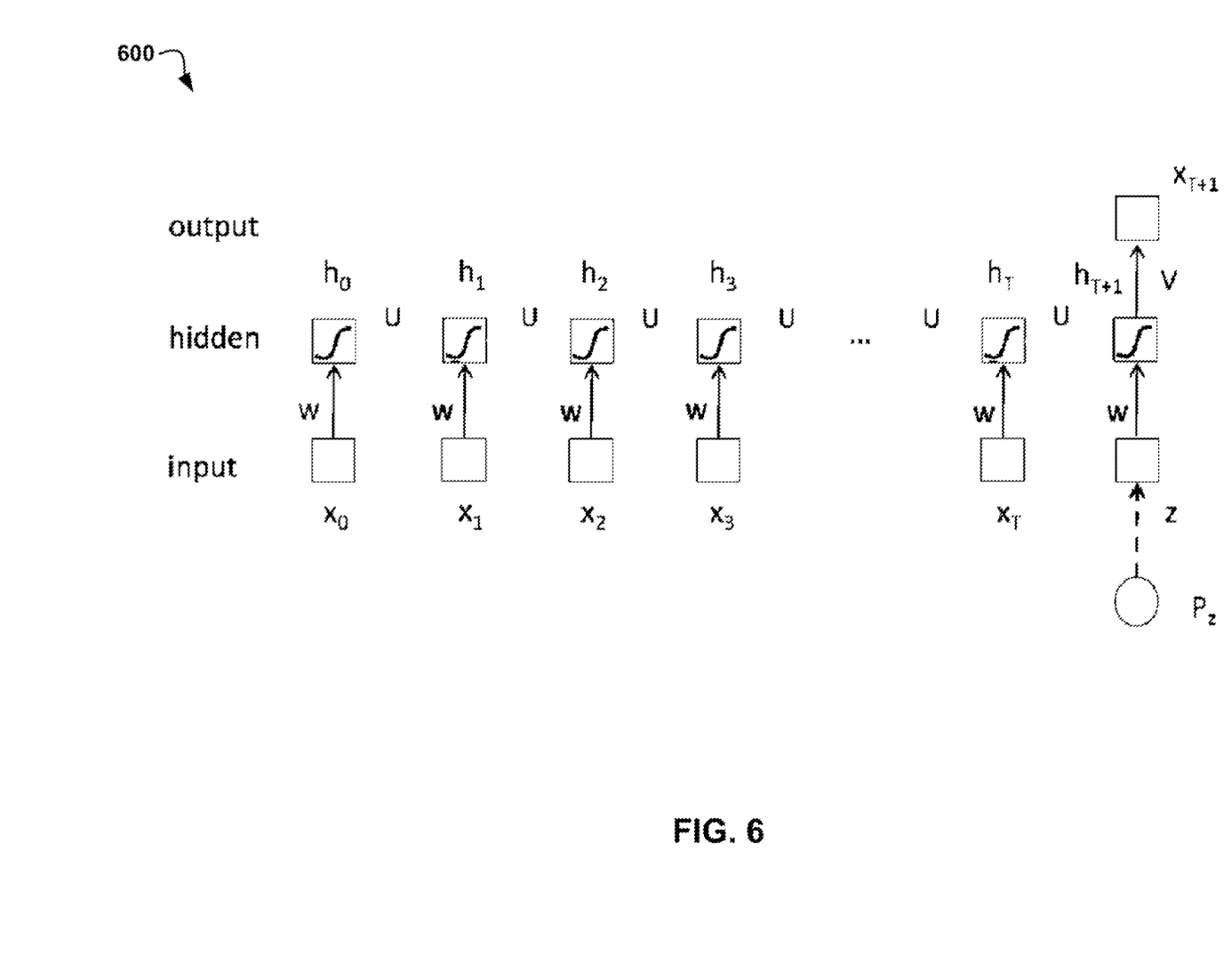
FIG. 6 is an illustration of a generative neural network, in accordance with an embodiment of the present invention.

FIG. 6 is an illustration of a generative neural network, in accordance with an embodiment of the present invention. In the embodiment, training module 134 may train a neural network of the pair to function as a generative neural network, and another as discriminative classification neural network. In the embodiment, the generative neural network may include Neural network architecture 600 where "input" is an input layer for receiving an input multidimensional or multivariate data point or vector such as of the monitored time series data set, the input multidimensional data point, denoted $x_t = (x_{1t}, x_{2t}, \ldots x_{Mt})^t$ and having a number of M dimensions or variables at time t, being part of a multidimensional or multivariate time series, denoted $X = (x_1, x_2, \ldots, x_T)$ and having a number of T time points in the time series; z is a sample drawn randomly from a prior historical time series data or probability distribution $p_z(z)$; "hidden" is a hidden layer having hidden states, denoted $h_0$, $h_1, \ldots, h_T$; "output" is an output layer, generating for output a forecasted or predicted multidimensional data point, denoted $X_{t+1}$, for a value at a future or subsequent time point; parameters W, U, and V function as weights applied between inputs and outputs within and between layers, as depicted. Advantageously, instances of the parameters W, U, and V are shared across layers, enabling compatibility for use with variably sized inputs having small or large numbers of time points.

Figure 7:
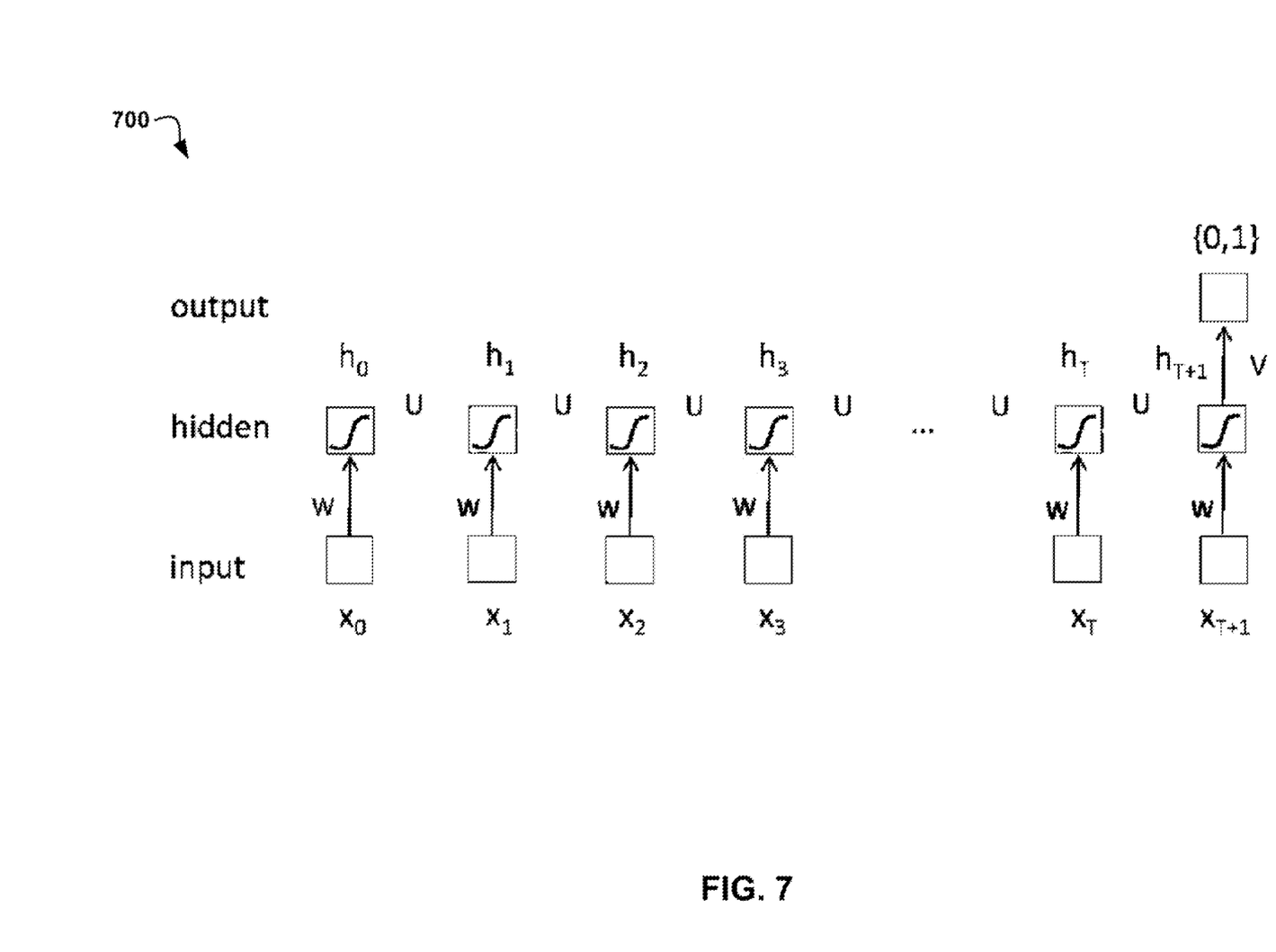
FIG. 7 is an illustration of a discriminative classification neural network, in accordance with an embodiment of the present invention.

FIG. 7 is an illustration of a discriminative classification neural network, in accordance with an embodiment of the present invention. In the embodiment of the present invention, the discriminative classification neural network may include Neural network architecture 700 where "input" is an input layer for receiving an actual or observed input multidimensional data point or vector, denoted $(x_1, x_2, \ldots, x_T; x_{t+1})$, such as of the monitored time series data set, where $X_{t+1}$ is the generated forecast data point such as from a neural network such as Neural network architecture 1, or is the actual future or subsequent observed input multidimensional data point in the input multidimensional time series; "hidden" is a hidden layer having hidden states, denoted $(h_0, h_1, \ldots, h_T; h_{t+1})$; and "output" is an output layer, generating for output a scaler, denoted $\{0,1\}$, where a "0" may be output in response to, for example, an input forecasted multidimensional data point from Neural network architecture 1, and "1" may be output in response to, for example, an actual or observed input multidimensional data point in the input multidimensional time series. In the embodiment, the discriminative neural network may be used as a classifier for use in determining, for example, whether $x_{t+1}$ is generated by the generative neural network or is an actual future or subsequent data point.

In an embodiment of the present invention, the adversarial training process may implement, for example, a training procedure in which the generative neural network may be trained so as to maximize a capability of the generative neural network to accurately forecast values expected of a future or subsequent data point, to maximize a likelihood of misclassification by the discriminative neural network.

Anomaly detection module 136 applies the neural networks with respect to the monitored time series data set to detect anomalies. In an embodiment of the present invention, one or both of the generative neural network and the discriminative neural network may be applied to detect anomalies in the monitored time series data set.

Figure 2:
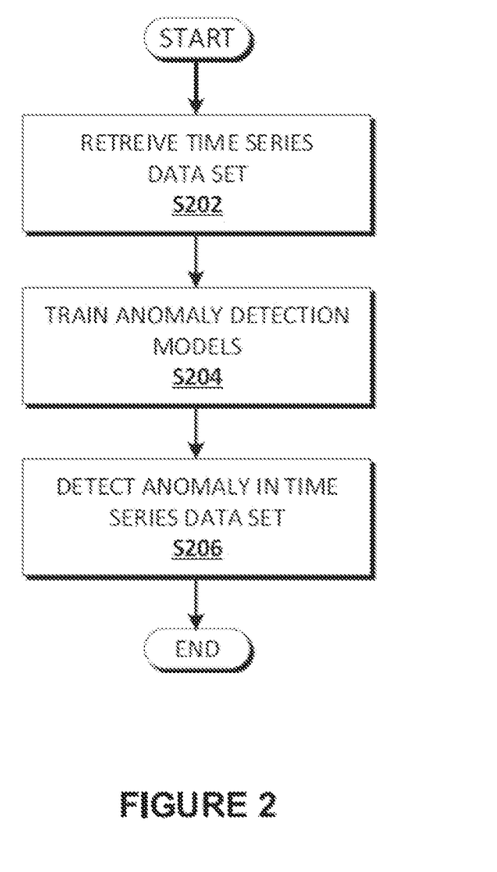
FIG. 2 is a flowchart depicting operational steps of an aspect of the anomaly detection system, in accordance with an embodiment of the present invention.

FIG. 2 is a flowchart depicting operational steps of an aspect of anomaly detection system 100, in accordance with an embodiment of the present invention.

At step S202, data collection module 132 communicates with historical data device 110 and monitored device 112 to retrieve data such as the historical time series data and the monitored time series data set, accordingly.

At step S204, training module 134 trains a pair of neural networks simultaneously by implementing the adversarial training process. In an embodiment of the present invention, training module 134 may use a time series data set such as the historical time series data set to implement the adversarial training process. The adversarial training process may be similar to that described in "Generative Adversarial Nets," by Goodfellow et al., which is incorporated herein by reference. In the embodiment, the adversarial training process may be implemented, for example, by way of Equation 1:

$$\min_{\theta_g} \max_{\theta_d} V(D, G) = \mathbb{E}_{x \sim p_{data}(x)}[\log D(x)] + \mathbb{E}_{x \sim p_z(x)}[\log(1 - D(G(z)))]$$

Equation 1 where "D" is a discriminative neural network; "$\theta_d$" denotes parameters of the discriminative neural network; "D(x)" is an output from "D," indicating the probability that x includes forecasted data points or the data points originating from the historical time series data; "G" is a generative neural network; "$\theta_g$" denotes parameters of the generative neural network; and "$p_z(z)$" denotes input noise variables.

In an embodiment of the present invention, the adversarial training process may be implemented to train the discriminative neural network to effectively classify and label data points as being generated by the generative neural network or as being of training data such as formed by the historical time series data. In the embodiment, the generative neural network may be trained simultaneously with the discriminative neural network, to minimize a value of "log(1−D(G(z)))," as in Equation 1, to maximize a capability of the generative neural network to accurately forecast values expected of a future or subsequent data point, thereby maximizing a likelihood of misclassification by the discriminative neural network. In the embodiment, the generative neural network may alternatively be trained to maximize a value of "log D(G(z))," to maximize the capability of the generative neural network to accurately forecast the values expected of the future or subsequent data point.

In an embodiment of the present invention, the adversarial training process may be implemented, for example, as a zero-sum game such as a minimax two-player game. In the embodiment, where each of the neural networks are defined by multilayer perceptrons, training module 134 may utilize backpropagation and dropout algorithms in training the neural networks. In the embodiment, forward propagation may be used to sample the generative neural network. In the embodiment, hidden states of the neural networks may be recursively computed according to, for example, Equation Set 1:

$$f(x) = Vh_{T+1}$$
$$h_{T+1} = \sigma(Uh_t + Wz),$$
$$h_t = \sigma(Uh_{t-1} + Wx_t), \text{ for } t = T, \ldots, 1$$
$$\ldots$$
$$h_0 = \sigma(Wx_0),$$

Equation Set 1

In an embodiment of the present invention, parameters of the neural networks such as parameters W, U, and V, may be inferred, for example, by using a backpropagation through time algorithm. In the embodiment, where a current output of a neural network is conditioned on long distance input such as in long time series, a Long Short Term Memory (LSTM) recurrent neural network may be implemented.

In an embodiment of the present invention, a generative neural network of the pair of neural networks may be trained by way of a historical time series data set to generate a model based on a data distribution, probability distribution, or the like, of data points in the historical time series data set. The historical time series data set may be, for example, similar to a monitored time series data set. In the embodiment, the generative neural network may be trained to generate the model such that it includes data relating to a temporal distribution of the data points in the monitored time series data set. In the embodiment, the generated model may be used by the generative neural network to forecast or predict values expected of a future or subsequent data point in the historical time series data set during training, and the monitored time series data set during use. In the embodiment, the discriminative neural network may be trained for use as a classifier to distinguish between forecasted values of data points and values of data points actually originating from a time series data set such as the historical time series data set or the monitored time series data set.

In an embodiment of the present invention, training module 134 may implement the adversarial training process by way of, for example, Algorithm 1:

---
Alogorithm 1
---

Algorithm 1 Minibatch stochastic gradient descent training of generative adversarial nets. The number of steps to apply to the discriminator, k, is a hyperparameter. We used k = 1, the least expensive option, in our experiments.

--- for number of training iterations do
    for k steps do
        Sample minibatch of m noise samples $\{z^{(1)}, \ldots, z^{(m)}\}$ from noise prior $p_g(z)$.
        Sample minibatach of m examples $\{x^{(1)}, \ldots, x^{(m)}\}$ from data generating distribution $p_{data}(x)$.

-continued

Alogorithm 1

Update the discriminator by ascending its stochastic gradient:

$$\nabla_{\theta_d} \frac{1}{m} \sum_{i=1}^{m} [\log D(x^{(i)}) + \log(1 - D(G(z^{(i)})))].$$

end for
Sample minibatch of m noise samples $\{z^{(1)}, \ldots, z^{(m)}\}$ from noise prior $p_g(z)$.
Update the generator by descending its stochastic gradient:

$$\nabla_{\theta_g} \frac{1}{m} \sum_{i=1}^{m} \log(1 - D(G(z^{(i)}))).$$

end for
The gradient-based updates can use any standard gradient-based learning rule. We used momentum in our experiments.

At step S206, the trained neural networks may be used in monitoring and detecting anomalies in the monitored time series data set. In an embodiment of the present invention, anomaly detection module 136 may apply the generative neural network to generate a data or probability distribution model by which to detect anomalies in the monitored time series data set. In the embodiment, the anomaly may be detected, for example, where differences between a forecasted or predicted value of an expected future or subsequent data point and the actual value of the future data point exceeds a predetermined threshold value. The forecasted or predicted value may be based on, for example, a generated probability distribution, or the like. In the embodiment, anomaly detection module 136 may alternatively or additionally apply the discriminative neural network to classify data points in the monitored time series data set as being anomalous or otherwise. The trained neural networks may be applied in, for example, monitoring device activity or performance to detect anomalies, monitoring financial activity to detect anomalies such as indicative of fraudulent activity, or the like. Generally, the trained neural networks may be applied with respect to any type of time series data set to detect anomalies therein, in accordance with embodiments of the present invention.

In an embodiment of the present invention, an action or operation such as a security action, a maintenance action, or the like, may be generated and implemented in response to detecting the anomalies. The security action may include, for example, implementing an account freeze or hold with respect to detected anomalies indicative of fraudulent activity, or the like. The maintenance action may include, for example, halting or otherwise controlling operation of a device based on detected anomalies indicative of potential or impending operational issues, or the like. Generally, actions may be generated in accordance with the detected anomalies and may include any type of preventative or remedial action implementable to minimize losses.

Figure 3:
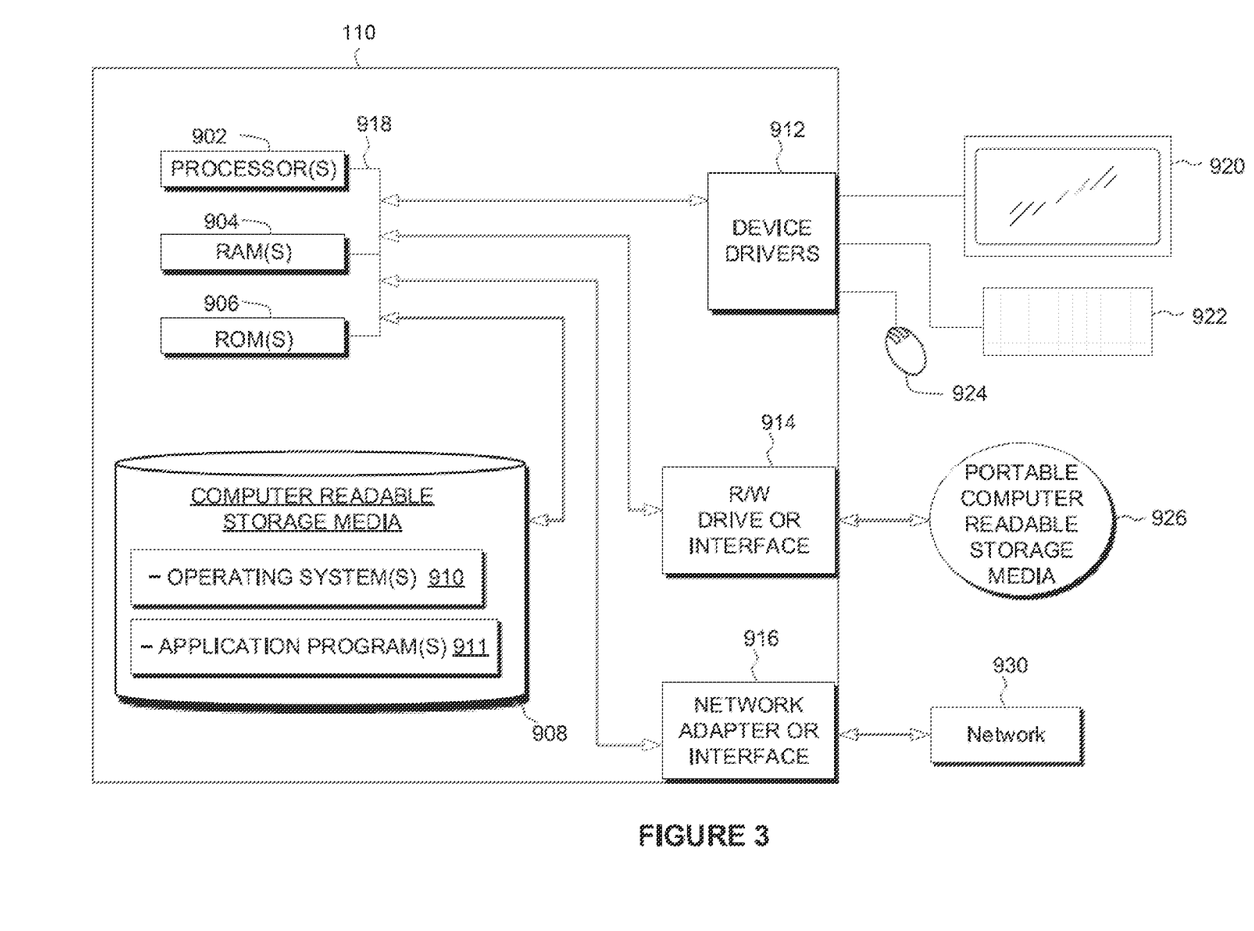
FIG. 3 is a block diagram depicting a historical data device 110, monitored device 112, and/or anomaly detection device 120, in accordance with an embodiment of the present invention.

FIG. 3 is a block diagram depicting historical data device 110 in accordance with an embodiment of the present invention. It may be appreciated that the block diagram could also apply to monitored device 112 (FIG. 1) and/or anomaly detection device 120 (FIG. 1). As depicted in FIG. 3, historical data device 110, along with monitored device 112 and/or anomaly detection device 120 as depicted in FIG. 1, may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as anomaly detection program 130 residing on anomaly detection device 120, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Historical data device 110, along with monitored device 112 and/or anomaly detection device 120 as depicted in FIG. 1, may also include a R/W drive or interface 914 to read from and write to one or more portable computer readable storage media 926. Application programs 911 on historical data device 110, along with monitored device 112 and/or anomaly detection device 120 as depicted in FIG. 1, may be stored on one or more of the portable computer readable storage media 926, read via the respective R/W drive or interface 914 and loaded into the respective computer readable storage media 908. Historical data device 110, along with monitored device 112 and/or anomaly detection device 120 as depicted in FIG. 1, may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. Historical data device 110, along with monitored device 112 and/or anomaly detection device 120 as depicted in FIG. 1, may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

Anomaly detection device 120, as depicted in FIG. 1, can be a standalone network server, or represent functionality integrated into one or more network systems. In general, historical data device 110, along with monitored device 112 and/or anomaly detection device 120 as depicted in FIG. 1, can be a laptop computer, desktop computer, specialized computer server, or any other computer system known in the art. In certain embodiments, anomaly detection device 120, as depicted in FIG. 1, represents computer systems utilizing clustered computers and components to act as a single pool of seamless resources when accessed through a network, such as a LAN, WAN, or a combination of the two. This implementation may be preferred for data centers and for cloud computing applications. In general, historical data device 110, along with monitored device 112 and/or anomaly detection device 120 as depicted in FIG. 1, can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
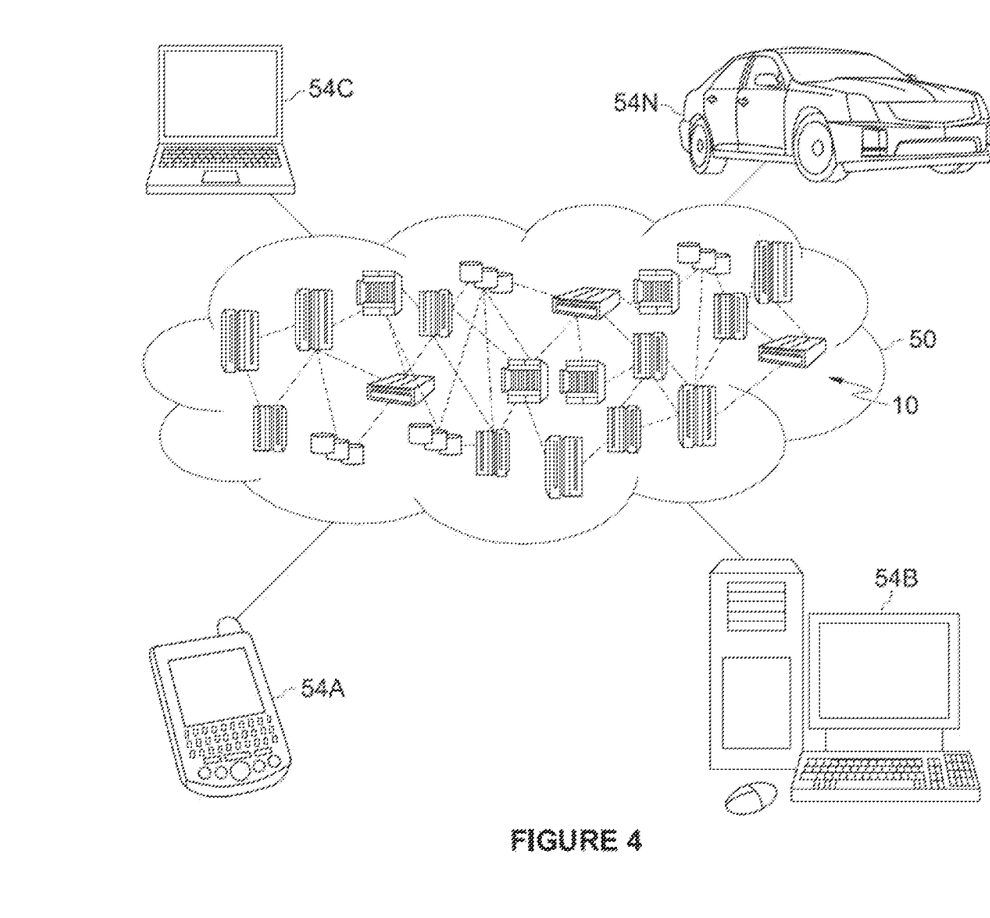
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
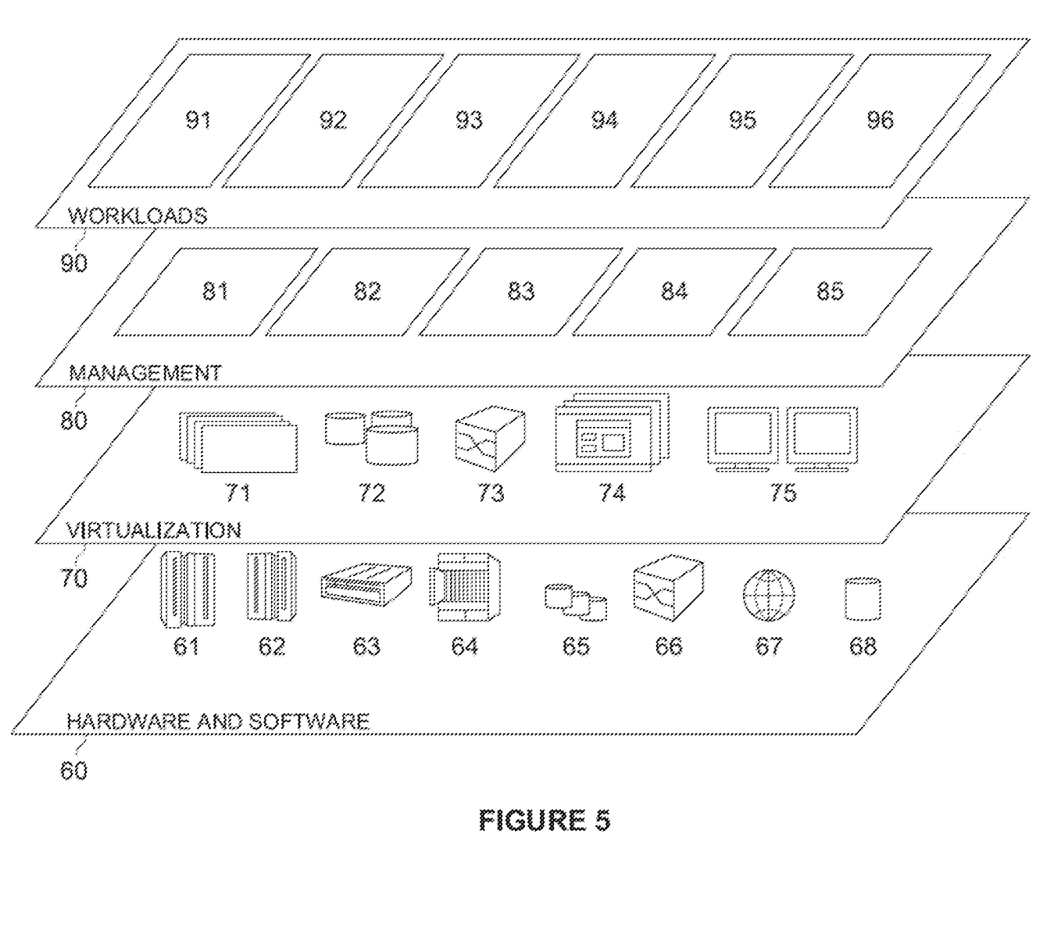
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96. Anomaly detection 96 may include functionality enabling the cloud computing environment to be used in detecting anomalies in a multidimensional time series data set, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method to detect anomalies in a multivariate or multidimensional time series data set, comprising:

retrieving the time series data set from a monitored device and a historical time series data set from a historical data device;

training a pair of neural networks simultaneously using the retrieved historical time series data set by implementing an adversarial training process to generate a generative neural network and a discriminative neural network, wherein the generative neural network is trained to generate a probability distribution model of data points in the historical time series data set, wherein the probability distribution model includes data relating to a temporal distribution of data points in the monitored time series data set, and wherein the discriminative neural network is trained to classify and label the data points in the historical time series data set as being generated by the generative neural network, and if the data points in the historical time series data set are not generated by the generative neural network, classifying and labeling the data points in the historical time series data set as training data, and wherein the discriminative neural network is further trained to distinguish between the data points that actually occur in the monitored time series data set and the historical time series data set, and a forecasted value of the data points in the monitored time series data set and the historical time series data set that are generated by the generative neural network; and detecting the anomalies in the time series data set of the monitored device by implementing both of the generative neural network and the discriminative neural network to monitor the time series data set, wherein a remedial action is performed on the monitored device in response to a detected anomaly in the time series dataset, and wherein at least one remedial action includes freezing an account on the monitored device if the anomaly is indicative of fraud.

2. The computer-implemented method of claim 1, wherein detecting the anomalies in the time series data set of the monitored device comprises:

generating, by the generative neural network, a probability distribution model based on the historical time series data set;

forecasting, by the generative neural network, a data point of the time series data set of the monitored device; and detecting an anomaly based on differences between the forecasted data point and an actual data point corresponding to the forecasted data point, wherein the anomaly is detected where the differences exceed a predetermined threshold.

3. The computer-implemented method of claim 1, wherein detecting the anomalies in the time series data set of the monitored device comprises:
classifying, by the discriminative neural network, a data point of the time series data set of the monitored device as being anomalous; and
detecting an anomaly based on the classification of the data point.

4. The computer-implemented method of claim 1, wherein the pair of neural networks comprises one or more recurrent multilayer perceptron neural networks.

5. The computer-implemented method of claim 4, wherein the pair of neural networks comprises Long Short Term Memory recurrent neural networks.

6. The computer-implemented method of claim 1, wherein training the pair of neural networks comprises implementing a backpropagation through time algorithm.

7. A computer system comprising:
one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method to detect anomalies in a multivariate or multidimensional time series data set, the method comprising:
retrieving the time series data set from a monitored device and a historical time series data set from a historical data device;
training a pair of neural networks simultaneously using the retrieved historical time series data set by implementing an adversarial training process to generate a generative neural network and a discriminative neural network,
wherein the generative neural network is trained to generate a probability distribution model of data points in the historical time series data set, wherein the probability distribution model includes data relating to a temporal distribution of data points in the monitored time series data set, and
wherein the discriminative neural network is trained to classify and label the data points in the historical time series data set as being generated by the generative neural network, and if the data points in the historical time series data set are not generated by the generative neural network, classifying and labeling the data points in the historical time series data set as training data, and wherein the discriminative neural network is further trained to distinguish between the data points that actually occur in the monitored time series data set and the historical time series data set, and a forecasted value of the data points in the monitored time series data set and the historical time series data set that are generated by the generative neural network; and
detecting the anomalies in the time series data set of the monitored device by implementing both of the generative neural network and the discriminative neural network to monitor the time series data set, wherein a remedial action is performed on the monitored device in response to a detected anomaly in the time series dataset, and wherein at least one remedial action includes freezing an account on the monitored device if the anomaly is indicative of fraud.

8. The computer system of claim 7, wherein detecting the anomalies in the time series data set of the monitored device comprises:
generating, by the generative neural network, a probability distribution model based on the historical time series data set;
forecasting, by the generative neural network, a data point of the time series data set of the monitored device; and
detecting an anomaly based on differences between the forecasted data point and an actual data point corresponding to the forecasted data point, wherein the anomaly is detected where the differences exceed a predetermined threshold.

9. The computer system of claim 7, wherein detecting the anomalies in the time series data set of the monitored device comprises:
classifying, by the discriminative neural network, a data point of the time series data set of the monitored device as being anomalous; and
detecting an anomaly based on the classification of the data point.

10. The computer system of claim 7, wherein the pair of neural networks comprises one or more recurrent multilayer perceptron neural networks.

11. The computer system of claim 10, wherein the pair of neural networks comprises Long Short Term Memory recurrent neural networks.

12. The computer system of claim 7, wherein training the pair of neural networks comprises implementing a backpropagation through time algorithm.

13. A computer program product comprising:
one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method to detect anomalies in a multivariate or multidimensional time series data set, the method comprising:
retrieving the time series data set from a monitored device and a historical time series data set from a historical data device;
training a pair of neural networks simultaneously using the retrieved historical time series data set by implementing an adversarial training process to generate a generative neural network and a discriminative neural network,
wherein the generative neural network is trained to generate a probability distribution model of data points in the historical time series data set, wherein the probability distribution model includes data relating to a temporal distribution of data points in the monitored time series data set, and
wherein the discriminative neural network is trained to classify and label the data points in the historical time series data set as being generated by the generative neural network, and if the data points in the historical time series data set are not generated by the generative neural network, classifying and labeling the data points in the historical time series data set as training data, and wherein the discriminative neural network is further trained to distinguish between the data points that actually occur in the monitored time series data set and the historical time series data set, and a forecasted value of the data points in the monitored time series data set and the historical time series data set that are generated by the generative neural network; and detecting the anomalies in the time series data set of the monitored device by implementing both of the generative neural network and the discriminative neural network to monitor the time series data set, wherein a remedial action is performed on the monitored device in response to a detected anomaly in the time series dataset, and wherein at least one remedial action includes freezing an account on the monitored device if the anomaly is indicative of fraud.

14. The computer program product of claim 13, wherein detecting the anomalies in the time series data set of the monitored device comprises:

generating, by the generative neural network, a probability distribution model based on the historical time series data set;

forecasting, by the generative neural network, a data point of the time series data set of the monitored device; and detecting an anomaly based on differences between the forecasted data point and an actual data point corresponding to the forecasted data point, wherein the anomaly is detected where the differences exceed a predetermined threshold.

15. The computer program product of claim 13, wherein detecting the anomalies in the time series data set of the monitored device comprises:

classifying, by the discriminative neural network, a data point of the time series data set of the monitored device as being anomalous; and detecting an anomaly based on the classification of the data point.

16. The computer program product of claim 13, wherein the pair of neural networks comprises one or more recurrent multilayer perceptron neural networks.

17. The computer program product of claim 16, wherein the pair of neural networks comprises Long Short Term Memory recurrent neural networks.

\* \* \* \* \*